May 8, 1962   R. E. EDWARDS   3,033,320
DISC BRAKE

Filed Jan. 8, 1960   3 Sheets-Sheet 1

Inventor
Roy Ernest Edwards
By: Scrivener and Parker
Attys.

May 8, 1962 R. E. EDWARDS 3,033,320
DISC BRAKE
Filed Jan. 8, 1960 3 Sheets-Sheet 2

Inventor
Roy Ernest Edwards
By: Scrivener and Parker
Attys.

May 8, 1962  R. E. EDWARDS  3,033,320
DISC BRAKE

Filed Jan. 8, 1960  3 Sheets-Sheet 3

Inventor
Roy Ernest Edwards
By: Scrivener and Parker
Attys.

United States Patent Office 3,033,320
Patented May 8, 1962

3,033,320
DISC BRAKE
Roy Ernest Edwards, Rowley Regis, England, assignor to Girling Limited, Birmingham, England, a British company
Filed Jan. 8, 1960, Ser. No. 1,314
Claims priority, application Great Britain Jan. 9, 1959
8 Claims. (Cl. 188—70)

This invention relates to improvements in brakes for vehicles.

In a brake according to our invention, angularly spaced arcuate shoes of wedge cross-section are mounted in a stationary housing for inward movement between the complementarily inclined inner faces of a pair of axially spaced discs splined or otherwise slidably keyed on a rotatable shaft passing through the housing, the entry of the shoes between the discs urging the discs apart to bring their outer faces into frictional engagement with stationary surfaces in the housing.

Rings or pads of friction material are interposed between the shoes and the discs and between the discs and the co-operating surfaces in the housing. The rings or pads may be bonded or otherwise secured to the inclined faces of the shoes and to the surfaces in the housing, or they may be secured to the inner and outer faces of the discs, or a combination of these arrangements may be employed.

The shoes are linked together at one end and are permitted a limited movement in a circumferential direction relative to the housing to produce a servo action when the brake is applied, and the shoes are actuated simultaneously by any convenient means.

A practical design of brake in accordance with our invention and a modification thereof are illustrated by way of example in the accompanying drawings in which:

FIGURE 4 is a diagrammatic elevation of one form of actuating lever mechanism for the brake, FIGURE 5 is a fragmentary plan of the lever mechanism.

Figure 1:
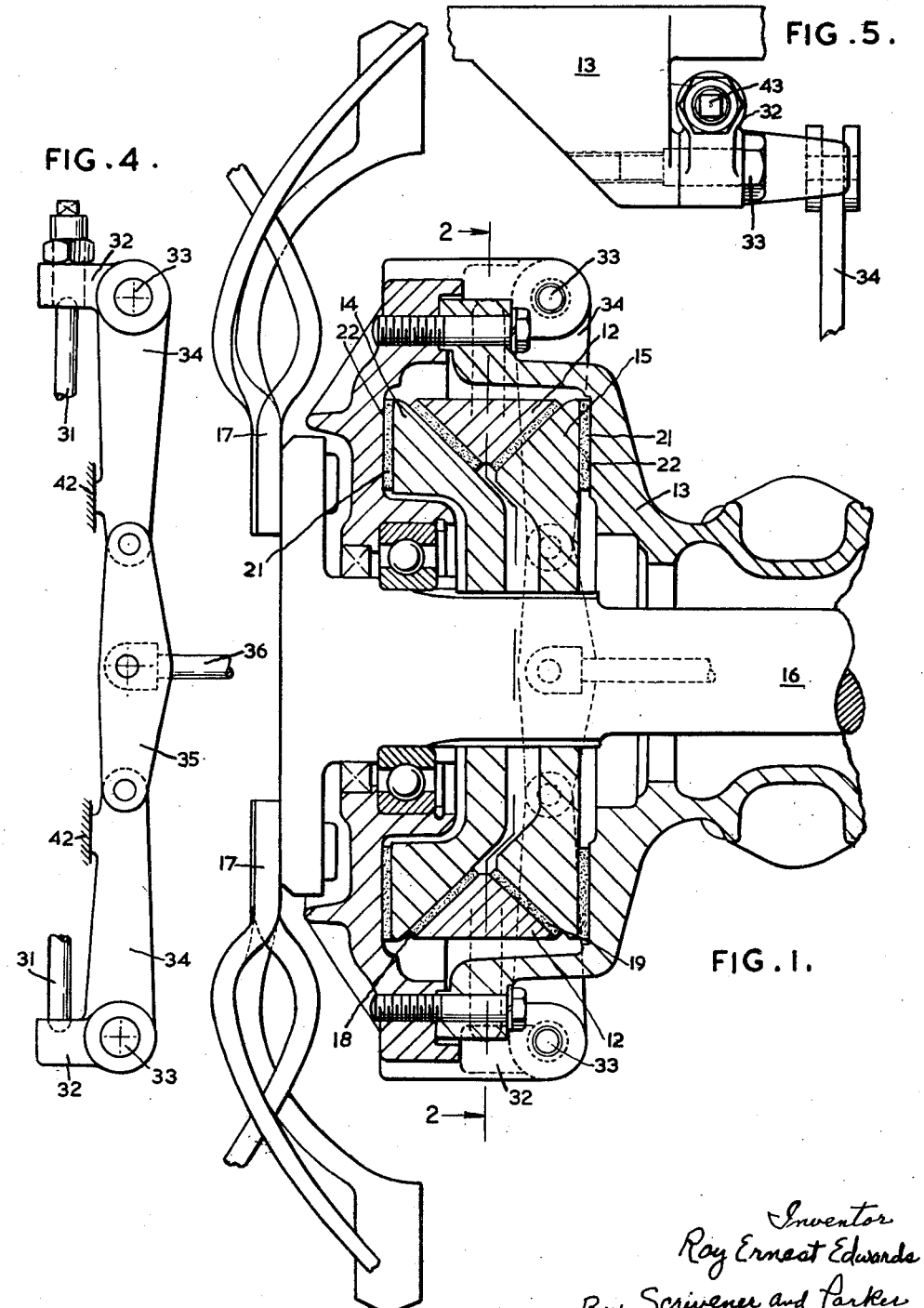
FIGURE 1 is a vertical section of a brake assembly in the plane of its axis.
Figure 2:
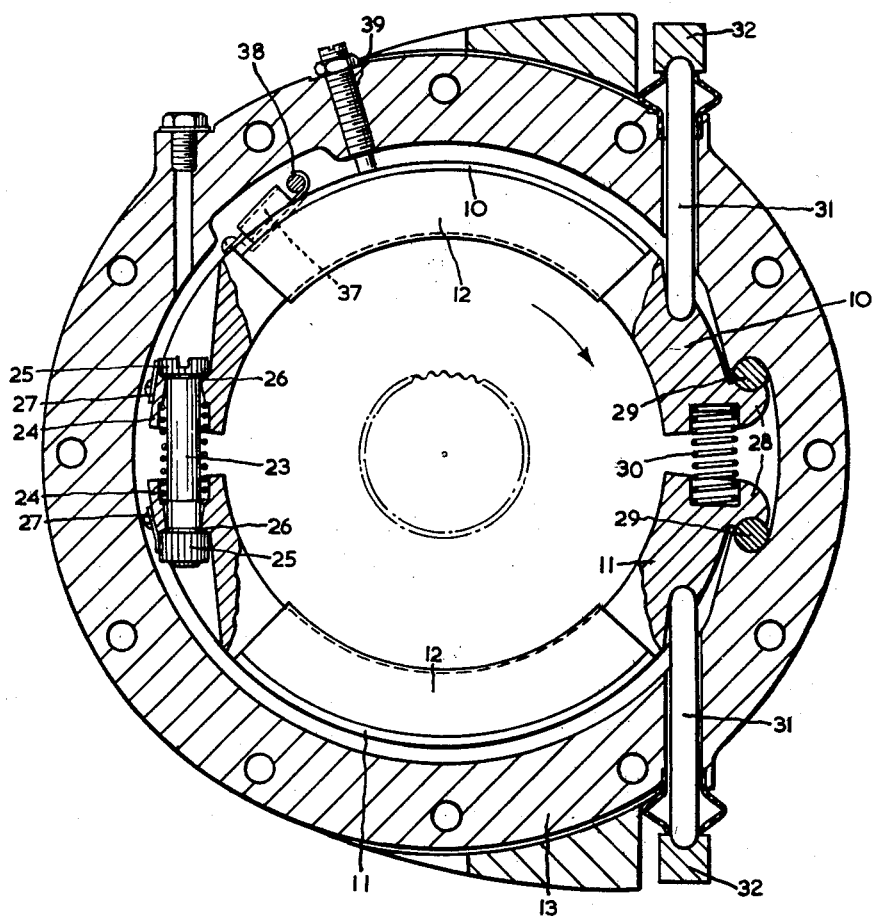
FIGURE 2 is a section on a line 2—2 of FIGURE 1 in a plane at right angles to the axis.

In the brake illustrated in FIGURES 1 and 2, there are two opposed arcuate shoes 10, 11 each subtending an angle of slightly less than 180° and each having a central portion 12 of wedge cross-section subtending an angle of about 90°. The angle of the wedge is about 90°.

The shoes are mounted within a stationary circular housing 13 enclosing two axially spaced discs 14, 15 splined on an axle shaft 16 which passes axially through the housing and carries a wheel indicated at 17.

The inner faces of the discs 14, 15 are oppositely inclined at the same angle as the faces of the wedge portions 12 of the shoes which are adapted to be urged radially inwards between the shoes. Pads of friction material 18, 19 are bonded or otherwise secured to the faces of the wedge portions 12 of the shoes for frictional engagement with the discs. The outer faces of the discs, which are flat and lie in planes at right angles to the axis of the shaft 16, carry rings or segmental pads 21 of friction material adapted to engage with complementary flat faces 22 on the walls of the housing when the discs are urged apart by the shoes.

The shoes 10, 11 are connected at one end by means allowing relative rocking movement of the shoes in their own planes. In the arrangement shown in FIGURES 1 and 2, the shoes are adjustably connected at one end by a spring-loaded turnbuckle 23 passing through aligned tangential openings in lugs 24 on the shoe ends. The turnbuckle has at each end a head 25 and these heads have part-spherical seatings 26 in the outer ends of the openings in the lugs 24. One head 25 is formed with a screwdriver slot for rotating it to adjust the effective length of the turnbuckle and both heads are serrated and held against rotation under vibration by detents 27.

The other ends of the shoes are formed with oppositely directed hooked lugs 28 engaging with fixed abutment pegs 29 in the housing against which they are normally held by a compression spring 30 located between the shoe ends.

Adjacent to the abutments the shoes are engaged by opposed aligned tappets 31 which are substantially tangential to a circle of which the inner edges of the shoes form part. The tappets are slidable through openings in the housing and their outer ends are engaged by short arms 32 of bell-crank levers, pivotally mounted on pins 33 in the housing. The other arms 34 of the bell-crank levers, which are of substantial length, are connected to opposite ends of a balance or equalising lever 35 to the centre of which is attached a pull-rod 36 or other actuating member.

When a pull is applied to the rod 36 the bell-crank levers are rocked angularly about their pivots and the short arms of the levers urge the tappets 31 inwardly to move the adjacent ends of the shoes towards each other.

The wedge portions of the shoes are thus urged inwardly between the discs which are urged apart in an axial direction into engagement with the end walls of the housing so that the discs are retarded by their engagement both with the shoes and with the housing.

When the brake is applied the actuated ends of the shoes are urged towards each other and away from their abutments 29. The shoes tend to be carried round with the discs and, depending on the direction of rotation of the discs, one shoe will move further away from its abutment and will apply a circumferentially directed pull to the other shoe through the turnbuckle 23 until the second shoe is returned to engagement with its abutment 29 so that a substantial self-servo action is obtained.

In the off position of the brake a tension spring 37 connected between one shoe and an anchorage 38 on the housing and acting in a substantially tangential direction holds that shoe against an adjustable stop formed by a set-pin 39 screwed through a radial bore in the housing. This centralises the shoes and maintains an equal clearance between the shoes and the discs in the off position of the brake.

Figure 3:
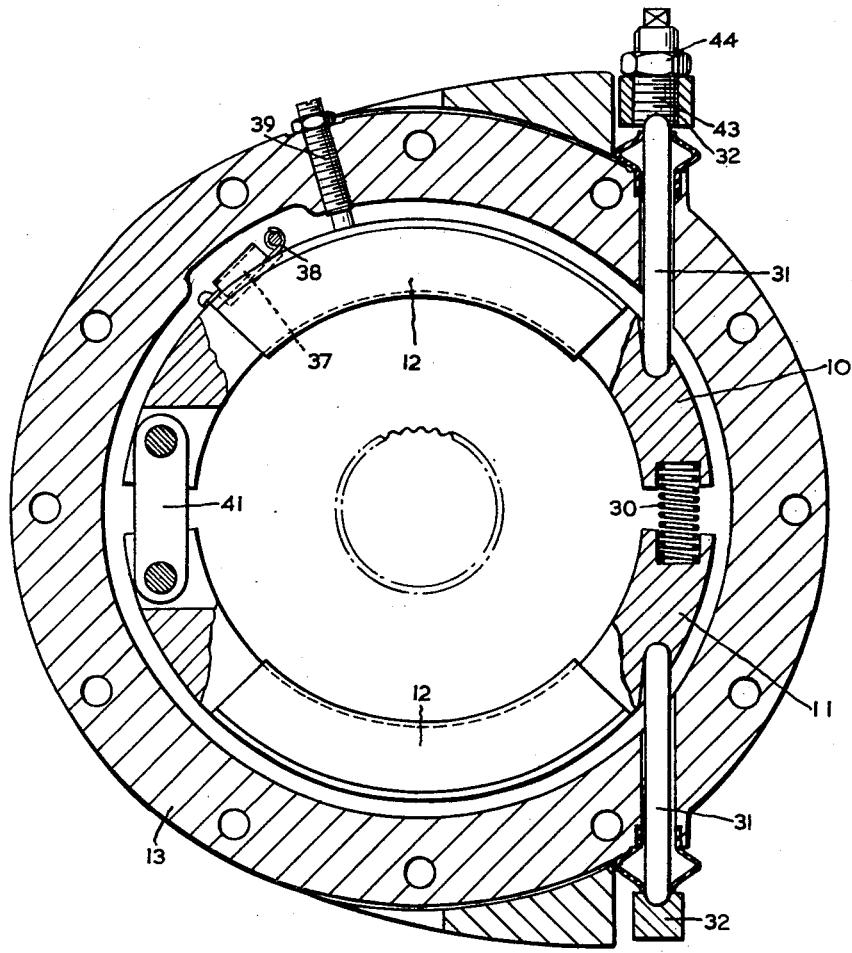
FIGURE 3 is a section similar to FIGURE 2 but showing a modified construction.

In the modification shown in FIGURE 3, the ends of the shoes remote from their actuated ends are pivotally connected by a link 41 of fixed length and the abutments 29 for the actuated ends of the shoes are omitted.

Stops or abutments for the circumferential movement of the shoes when the brake is applied are formed by fixed abutments 42 with which the long arms of the bell crank levers engage as shown in FIGURE 4.

When the brake is applied by a pull on the rod 36, the arms 34 of both levers move away from the abutments 42. The circumferential movement of the shoes is transmitted through one or other of the tappets, depending on the direction of rotation of the discs, to the corresponding bell crank lever which is returned until its long arm engages the corresponding abutment 42 which prevents further circumferential movement of the corresponding shoe while the other shoe, tappet, and bell-crank lever are free to continue their movement to provide a self-servo action.

As the link 41 is of fixed length an adjustment for the shoes is provided by arranging for the outer end of one of the tappets 32 to engage with an abutment 43 adjustably screwed through the short arm 33 of one of the bell-crank levers and secured by a lock-nut 44.

What is claimed is:

1. A brake comprising a substantially cylindrical stationary housing having spaced end walls, a rotatable shaft passing axially through said housing, a pair of axially spaced discs slidably keyed on said shaft within the housing, a radial outer face and an inclined inner face on each of said discs, the inclined inner faces of said discs being adjacent to one another and diverging outwardly, angularly spaced arcuate shoes in said housing, wedge portions on said shoes at the middle of their lengths, a pivotal coupling between the shoes at one end, and means for urging the other ends of said shoes towards each other to urge the wedge portions of the shoes between the oppositely inclined inner faces of said discs to force said discs apart and bring their radial outer faces into frictional engagement with stationary radial surfaces on the end walls of said housing.

2. A brake as in claim 1 wherein friction material is interposed between the wedge portions of the shoes and the inclined inner faces of the discs and between the radial outer faces of the discs and the radial surfaces on the end walls of the housing, said friction material being secured to one of each of the pairs of co-operating surfaces.

3. A brake as in claim 1 wherein said shoes are pivotally coupled at one end by a turnbuckle of adjustable length and are permitted a limited circumferential movement relative to the housing, and stops are provided to limit the circumferential movement of either shoe according to the direction of rotation of the discs.

4. A brake as in claim 1 wherein said shoes are pivotally connected at one end by a turnbuckle of adjustable length and the other ends of the shoes have hooked lugs engaging with fixed abutments in the housing with which they are normally held in engagement by a compression spring located between the shoe ends.

5. A brake as in claim 1 wherein said means for urging towards each other the ends of the shoes remote from their coupled ends comprise opposed aligned tappets which are substantially tangential to a circle of which the inner edges of the shoes form part, bell crank levers pivoted on the housing and engaging the outer ends of said tappets, and means for simultaneously moving said bell crank levers angularly.

6. A brake as in claim 1 wherein said shoes are permitted a limited circumferential movement within said housing, the coupled ends of the shoes are connected by a link of fixed length, and the means for urging towards each other the ends of the shoes remote from their coupled ends comprise opposed aligned tappets movable in the housing in a line tangential to the shoes, bell crank levers pivotally mounted on the housing and engaging the outer ends of said tappets, means for simultaneously moving said bell crank levers angularly to apply the brake, and stops limiting the return movement of each bell-crank lever.

7. A brake comprising a stationary housing, a rotatable shaft passing through said housing, a pair of axially spaced discs slidably keyed on said shaft within the housing, stationary faces on said housing, outer faces on said discs engageable with said stationary faces, an inclined inner face on each disc, said inclined inner faces being adjacent to one another and diverging outwardly, angularly spaced arcuate shoes of wedge cross-section mounted within said housing outwardly of said inclined inner faces, and means for urging the shoes between and into engagement with said inner faces to separate the discs and urge their outer faces into frictional engagement with said stationary faces.

8. A brake comprising a stationary torque taking member, a pair of torque sustaining surfaces on said member, a rotatable shaft passing through said member, a pair of axially spaced discs slidably keyed on said shaft, an inclined face on each disc, said faces being oppositely inclined, a radially movable braking member, oppositely inclined frictional surfaces on said braking member and means for moving said braking member in a substantially radial direction for effecting frictional engagement between the inclined faces on the braking member and the discs and for moving the discs axially into engagement with said torque sustaining surfaces.

References Cited in the file of this patent

UNITED STATES PATENTS

| 1,122,933 | Hufford | Dec. 29, 1914 |
| 2,057,422 | Dickson | Oct. 13, 1936 |
| 2,344,933 | Lambert | Mar. 21, 1944 |
| 2,387,039 | Parrett | Oct. 16, 1945 |
| 2,808,129 | Kraus | Oct. 1, 1957 |
| 2,955,680 | Caero | Oct. 11, 1960 |